(12) United States Patent
Davis

(10) Patent No.: US 7,619,683 B2
(45) Date of Patent: Nov. 17, 2009

(54) APPARATUS INCLUDING A DUAL CAMERA MODULE AND METHOD OF USING THE SAME

(75) Inventor: Raymond A. Davis, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 945 days.

(21) Appl. No.: 10/651,599

(22) Filed: Aug. 29, 2003

(65) Prior Publication Data

US 2005/0046740 A1 Mar. 3, 2005

(51) Int. Cl.
*H04N 5/225* (2006.01)
*H04N 5/228* (2006.01)

(52) U.S. Cl. .............. 348/374; 348/222.1; 348/211.1

(58) Field of Classification Search .......... 348/374, 348/222.1, 211.1
See application file for complete search history.

(56) References Cited

U.S. PATENT DOCUMENTS

| | | | | |
|---|---|---|---|---|
| 5,321,772 A * | 6/1994 | Sawyer | ..................... | 382/216 |
| 5,509,663 A * | 4/1996 | Otake et al. | ..................... | 463/33 |
| 5,812,703 A * | 9/1998 | Juen et al. | ..................... | 382/274 |
| 5,852,502 A * | 12/1998 | Beckett | ..................... | 358/512 |
| 6,639,626 B1 * | 10/2003 | Kubo et al. | ..................... | 348/218.1 |
| 7,024,041 B2 * | 4/2006 | Sasa | ..................... | 382/221 |
| 7,030,927 B2 * | 4/2006 | Sasaki | ..................... | 348/345 |
| 7,057,647 B1 * | 6/2006 | Monroe | ..................... | 348/217.1 |
| 2001/0050721 A1 * | 12/2001 | Miyake | ..................... | 348/374 |
| 2002/0057344 A1 * | 5/2002 | Miyake et al. | ..................... | 348/207 |
| 2002/0108011 A1 * | 8/2002 | Tanha | ..................... | 710/306 |
| 2002/0122113 A1 * | 9/2002 | Foote | ..................... | 348/48 |
| 2002/0176009 A1 * | 11/2002 | Johnson et al. | ..................... | 348/229 |
| 2003/0001222 A1 * | 1/2003 | Street et al. | ..................... | 257/444 |
| 2003/0036365 A1 * | 2/2003 | Kuroda | ..................... | 455/90 |
| 2003/0098917 A1 * | 5/2003 | Oda | ..................... | 348/272 |
| 2003/0117501 A1 * | 6/2003 | Shirakawa | ..................... | 348/218.1 |
| 2004/0001149 A1 * | 1/2004 | Smith | ..................... | 348/218.1 |
| 2004/0119718 A1 * | 6/2004 | Kayada | ..................... | 345/502 |
| 2004/0179600 A1 * | 9/2004 | Wells et al. | ..................... | 375/240.12 |
| 2004/0230358 A1 * | 11/2004 | Stam et al. | ..................... | 701/49 |
| 2004/0252642 A1 * | 12/2004 | Larson et al. | ..................... | 370/235 |
| 2005/0249404 A1 * | 11/2005 | Xiaomang | ..................... | 382/162 |
| 2006/0197847 A1 * | 9/2006 | Johnson et al. | ..................... | 348/229.1 |
| 2006/0255144 A1 * | 11/2006 | Meier et al. | ..................... | 235/454 |
| 2008/0156882 A1 * | 7/2008 | Tsikos et al. | ..................... | 235/462.43 |

FOREIGN PATENT DOCUMENTS

JP 02-248170 * 3/1990

OTHER PUBLICATIONS

"OmniVision Product Families" advertising: "The CameraChip Family," "The CameraKit Family," and "The CameraMate Family." Downloaded from http://www.ovt.com/i_products.html on Aug. 28, 2003. 2 pages.
"ST Microelectronics Announces Mobile Digicam Module!" by Michael R. Tomkins. Source: The Imaging Resource. Dated: Friday, Feb. 23, 2001. 3 pages.
"Agilent Embedded CMOS Camera Module," Inspirics Electronics. Downloaded from http://www.inspirics.com/portfolio/cammodule/ on Aug. 28, 2003.
Challenge—color Camera Module product specification sheet. First edition 2001. 4 pages Downloaded on Aug. 28, 2003 from http://us.st.com/stonline/press/magazine/challeng/1stedi01/chal03.htm.

* cited by examiner

*Primary Examiner*—Sinh Tran
*Assistant Examiner*—Hung H Lam
(74) *Attorney, Agent, or Firm*—Ratner Prestia

(57) ABSTRACT

An apparatus such as a wireless telephone and methods of using the apparatus are disclosed, the apparatus having a dual camera module. The dual camera module includes a flex interconnect on which a first image module and a second image module are attached, each image module adapted to capture images. The two image modules can be placed such that images can be captured in different directions; at different resolutions; at different times; independently or simultaneously; generating independent or composite data streams.

38 Claims, 2 Drawing Sheets

APPARATUS INCLUDING A DUAL CAMERA MODULE AND METHOD OF USING THE SAME

BACKGROUND

The present invention relates to camera modules, and more particularly, to digital camera modules within a wireless communication device.

Portable electronic devices such as personal digital assistants (PDAS) and cellular telephones are becoming increasingly popular. Some of these devices have a built-in integrated digital camera module allowing the devices to take pictures.

The integrated camera module typically includes lens focusing a scene onto a digital imager. Further, the integrated camera module typically includes flexible printed circuit board (FPCB) interconnect ("flex interconnect") connecting the camera module to other portions of the portable electronic device such as its application (host or main) processor. FPCBs are known in the industry and are usually made of copper laminated polyimid that has copper "wires," or traces, and may have copper "lands" onto which passive components (such as resistors or capacitors, used for signal integrity, power supply filtering, or electro-magnetic interference (EMI) suppression) or an active component (such as a voltage regulator), or an integrated circuit (IC, here, imaging IC) is attached, or combinations of such.

Often, the integrated camera module is packaged within a portable electronic device package (for example, a cellular telephone) having a fixed direction either toward or away from the person using the cellular telephone. For simplicity of discussion, a cellular telephone is used herein this document as the example portable electronic device.

To provide an ability to take pictures in the opposite direction (compared to the fixed direction), the integrated camera module needs to be flipped or rotated. In fact, some portable electronic devices include a rotating mechanism to allow its integrated camera module to take pictures in opposing directions. However, such mechanical rotators or flipping hinges add complexity and costs to the cellular telephone. Moreover, such mechanical systems decrease reliability of the cellular telephone.

Another approach to provide the ability to take pictures in the opposite direction (compared to the fixed direction) is to provide two integrated camera modules—the first module facing toward the user and the second module facing away from the user. However, this approach leads to the doubling of the camera module portion of the costs, doubles the area and connection requirements for the integrated camera modules within the cellular telephone (because an attachment are made to connect each module separately) thereby reducing reliability, increasing assembly time, and increases adverse electronic consequences within the cellular phone. These include, for example, increased power usage (due to redundant flex interconnect associated bus loading) and increased electromagnetic interference (EMI) and increased electrical overstress (EOS) susceptibility (due to the multiple flex interconnects acting as multiple antennas).

Accordingly, there remains a need for a device that eliminates or alleviates these shortcomings.

SUMMARY

The need is met by the present invention. According to a first embodiment of the present invention, a dual camera module includes two image modules attached to a flex interconnect.

In a second embodiment of the present invention, an electronic apparatus includes a substrate and a dual camera module attached to the substrate. The dual camera module is adapted to capture images and includes a first image module adapted to capture images in a first direction and a second image module adapted to capture images in a second direction.

In a third embodiment of the present invention, an electronic apparatus includes a substrate, a first image module adapted to capture images mounted on a first side of said substrate, and a second image module adapted to capture images mounted on a second side of said substrate. The apparatus includes a screen adapted to display images captured by the first image module and by the second image module.

In a fourth embodiment of the present invention, a method of operating an electronic apparatus is disclosed. First, a scene is captured using a first image module for previewing the scene on a display. After the preview, the scene is captured using a second image module.

In a fifth embodiment of the present invention, a method of operating an electronic apparatus is disclosed. First, a scene is captured using a first image module and a second image module, the two image modules operating simultaneously and synchronously generating a composite image data stream.

Other aspects and advantages of the present invention will become apparent from the following detailed description, taken in conjunction with the accompanying drawings, illustrating by way of example the principles of the invention.

DETAILED DESCRIPTION

The present invention will now be described with reference to FIGS. 1 through 4, which illustrate various embodiments of the present invention. As illustrated in the Figures, relative sizes of various portions, structures, or any combination of these are exaggerated for illustrative purposes and, thus, are provided to illustrate the general structures of the present invention.

Various aspects of the present invention are described with reference to a device having one or more layers, regions, structures, portions, or any combination of these having a position relative to other layers, regions, structures, or portions. These relative positions may be described using common relative positional descriptors such as, for example, "on," "above," "over," "left," "right," "front," "back," "under," "below," "beneath," or any combination of these. It will be understood that these terms are intended to encompass different orientations of the device in addition to the orientation depicted in the Figures. For example, an embodiment of a device having a first portion above a second portion encompasses an embodiment of the device having the first portion below the second portion if the device is flipped. References to a layer, a region, a structure, or a portion located on or above another layer, region, structure, or portion without an intervening region, structure, or portion are described as being formed "directly on" or "directly above" the other layer, region, structure, or portion. Like numbers refer to like elements throughout.

As shown in the figures for the purposes of illustration, one embodiment of the present invention is exemplified by an apparatus, for example a cellular telephone. The apparatus includes a dual camera module with a first image module for capturing images in a first direction and a second image module for capturing images in a second direction. Here, the first image module and the second image module share a flex interconnect thereby eliminating or alleviating the shortcomings with the prior art approaches discussed above.

Figure 1:
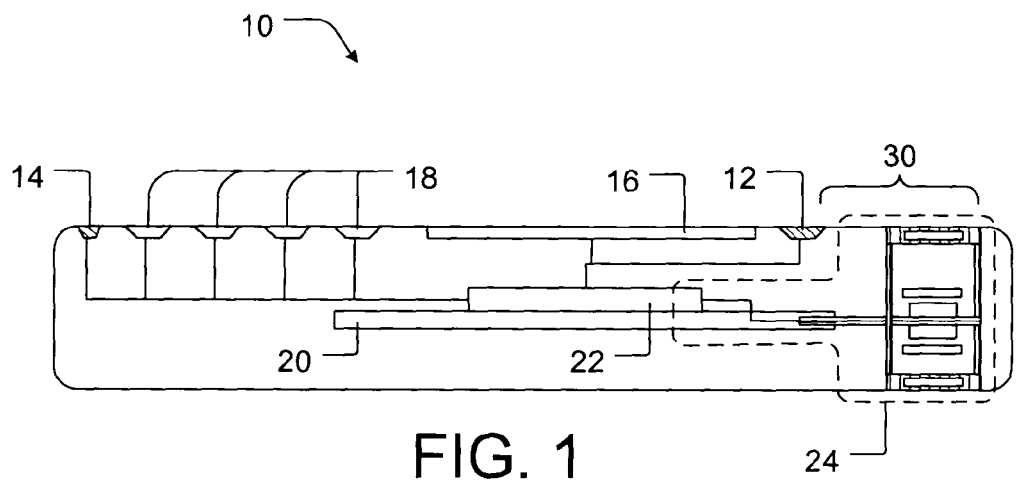
FIG. 1 illustrates a simplified cutaway schematic view of an apparatus including a dual camera module in accordance with one embodiment of the present invention.

FIG. 1 illustrates a simplified cutaway schematic view of an electronic apparatus 10 including a dual camera module 30 in accordance with one embodiment of the present invention. In the present example, the apparatus 10 is a cellular telephone 10. However, the apparatus 10 can be other electronic devices such as a personal digital assistant (PDA), a notebook computer, or such. The apparatus 10 likely includes a speaker 12, a microphone 14, and a screen 16. The apparatus 10 is also likely to include a plurality of input means such as buttons 18 for controlling the apparatus 10. Internally, the apparatus 10 includes electronic circuit elements mounted on a substrate 20 such as a printed circuit board (PCB). The internal electronic circuit elements are represented here by a processor 22.

Figure 2A:
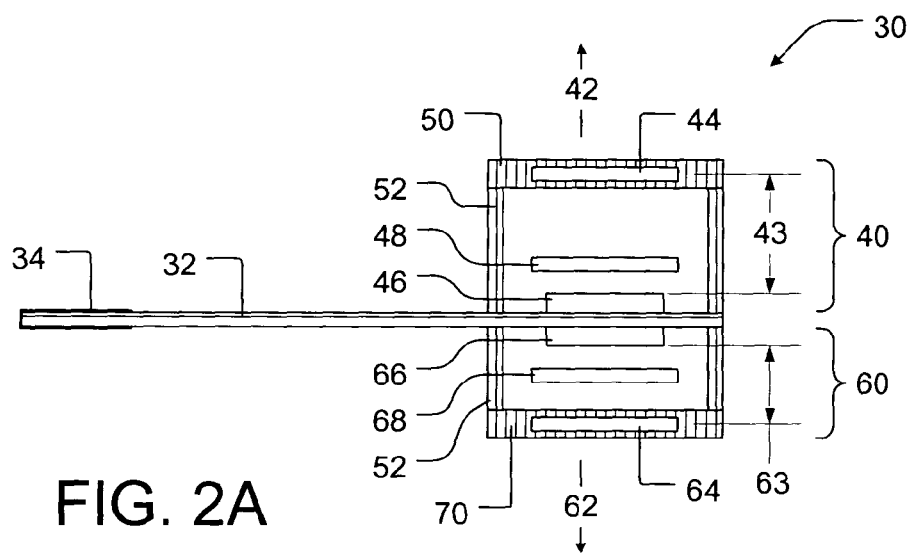
FIG. 2A illustrates the dual camera module illustrated in FIG. 1 in a greater detail.
Figure 2B:
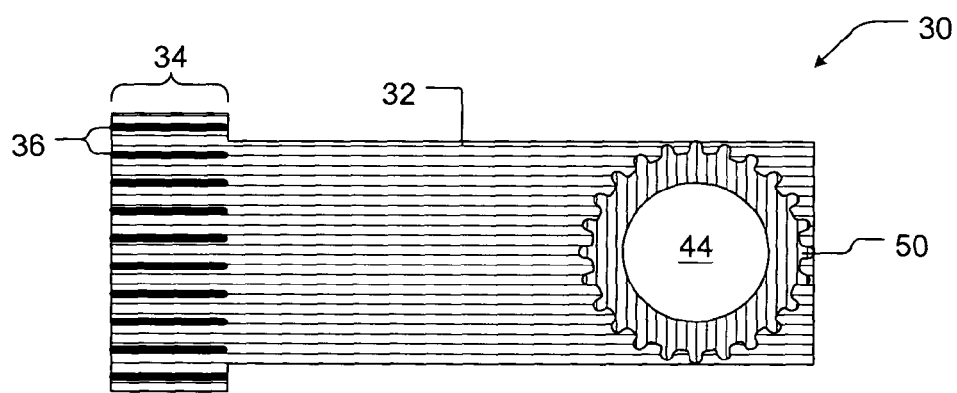
FIG. 2B illustrates a top view of the dual camera module illustrated in FIG. 2A.

FIG. 2A illustrates the dual camera module 30 illustrated in FIG. 1 in a greater detail. FIG. 2B illustrates a top view of the dual camera module 30 illustrated in FIG. 2A. Referring to FIGS. 1 through 2B, the dual camera module 30 includes a first image module 40 and a second image module 60.

The first image module 40 is adapted to capture images in a first direction 42. The first image module 40 includes a first lens 44 that focuses a first image (in the first direction 42 of the first image module 40) on a first sensor 46. The first sensor 46 can be, for example, a CMOS (complementary metal-oxide semiconductor) chip commonly used in digital imaging sensor applications and readily available in the marketplace. The first sensor 46 can also include image processor circuits. In that case, the first sensor 46 is a combination sensor and processor. In fact, the first sensor 46 can be a single integrated circuit (IC) or can be a sensor IC assembled in combination with an image processing IC (for example, a sensor IC assembled with an image processor IC as its substrate, directly connected through adhesive conductors, wire bonds, solder balls, and like.

The first image module 40 can also include other components such as a first imaging filter 48. The first lens 44 is held by a first lens holder 50 which can be a part of a frame 52 housing the above described components of the first image module 40. It is understood that the first lens 44 and the first lens holder 50 can be adjusted to optimize the first lens 44 for best position above the first imager 56 for optimal focus. There are various mechanical and even electro-mechanical methods of doing this known in the art. Further, it is also possible to build the apparatus 10 having a variable-focus system.

Figure 3:
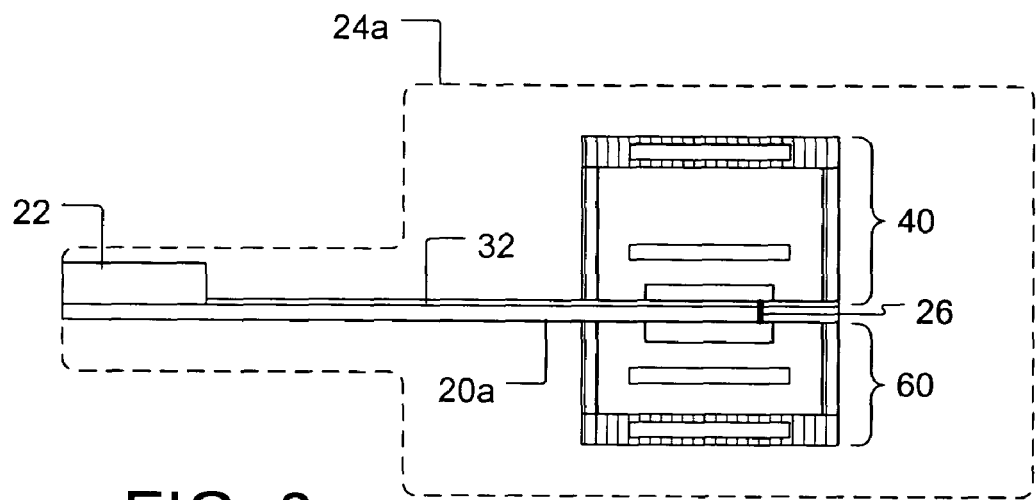
FIG. 3 illustrates a simplified cutaway schematic view of a portion of an apparatus including a dual camera module in accordance with another embodiment of the present invention.
Figure 4:
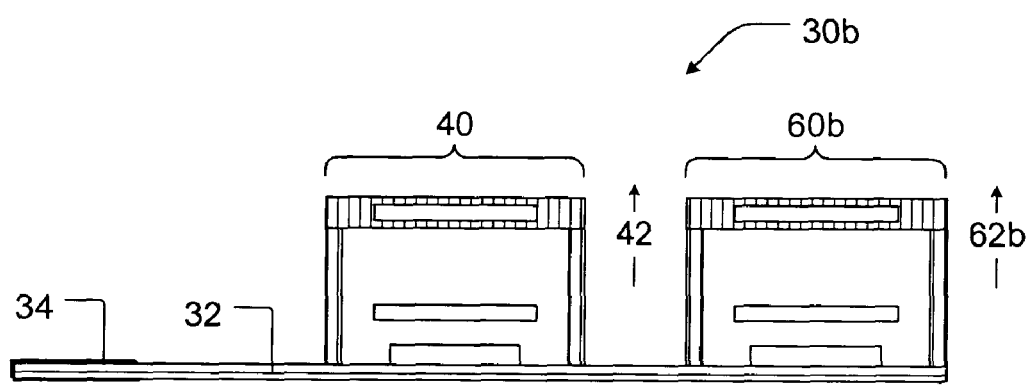
FIG. 4 illustrates yet another embodiment of the dual camera module of the present invention.

The second image module 60 is adapted to capture images in a second direction 62. In the illustrated embodiment, the second direction 62 is opposite direction relative to the first direction 42. However, this is not required. FIGS. 1, 2A, and 3 show one module directly above the other module (almost doubling the height of the assembly); however, this is not required. It is understood that the modules 40 and 60 can be attached to the flex in such a way so that the flex could be bent or folded as illustrated in FIG. 4. The second image module 60 includes a second lens 64 that focuses a second image (in the second direction 62 of the second image module 60) on a second sensor 66. The second sensor 66 can be, for example, a CMOS (complementary metal-oxide semiconductor) chip commonly used in digital imaging sensor applications and readily available in the marketplace. The second sensor 66 can also include image processor circuits. In that case, the second sensor 66 is a combination sensor and processor. In fact, the second sensor 66 can be a single integrated circuit (IC) or can be a sensor IC assembled in combination with an image processing IC (for example, a sensor IC assembled with an image processor IC as its substrate, directly connected through adhesive conductors, wire bonds, solder balls, and like.

The second image module 60 can also include other components such as a second imaging filter 68. The second lens 64 is held by a second lens holder 70 which can be a part of the frame 52 housing the components of both the first image module 40 and the second image module 60. It is understood that the second lens 64 and the second lens holder 70 can be adjusted to optimize the second lens 64 for best position above the second imager 66 for optimal focus. There are various mechanical and even electro-mechanical methods of doing this known in the art. Further, it is also possible to build the apparatus 10 having a variable-focus system.

The first image module 40 and the second image module 60 can be configured for differing purposes or individually optimized. For example, the first image module 40 can have a first focal length (defined by the first lens 44 and a first distance 43 between the first sensor 46 and the first lens 44) for imaging scenes relatively far in the first direction 42 where the second image module 60 has a second focal length (defined by the second lens 64 and a second distance 63 between the first sensor 66 and the first lens 64) for imaging scenes relatively close in the first direction 62.

For visible light imaging (for example, taking pictures), an infra-red (IR) filter is usually used as the first imaging filter 48, the second imaging filter 68, or both. For non-visible light imaging, the imaging filters 48 and 68 would block visible light (and allow, for example, only IR light). Therefore, for IR applications, either no IR filter, or perhaps a non-IR filter might be used. The imaging filters 48 and 68 are illustrated as separate physical element for clarity of discussion; however, it is understood that such filters may not be a separate element in the light path, but could be incorporated into a film or property of any element in the light path (e.g. lens material, film or layer on the lens 44 and 64 or the sensors 46 and 66.

The dual camera module 30 includes a flex interconnect 32 to which the first image module 40 and the second image modules 60 are attached. The flex interconnect 32 includes a plurality of wires including wires implementing Inter-Integrated Circuit (I2C) bus protocol known in the art. When implemented, each of the image modules 40 and 60 can be programmed to respond to a unique I2C address relative to each other. Further, each of each of the image modules 40 and 60 is configured to tri-state its output signals. There are other parallel or serial control and data bus protocols that could be used to implement the multi-camera module system, such as the Serial Peripheral interface (SPI). The I2C bus is a common two-wire interface used in the illustrated embodiment for the purposes of disclosing the invention.

In alternative embodiments, each camera module can be designed to respond to a shared (or global) I2C address. Two (or more) camera modules could receive a shared (or global)

instruction (for example, to "RUN") simultaneously. Advantages include reduced time to communicate to all modules, and the ability to have all camera modules "RUN" simultaneously for synchronized operation. Furthermore, if the camera module consists of a sensor/imager processor, such module can be designed to respond to a shared "sensor" global I2C address as well as a shared "image processor" global I2C address. Advantage in such embodiments include, for example, the fact that a sensor gain register setting could be sent to all sensors, a sizer value could be sent to all image processors, or both.

The dual camera module 30 may further include a connection portion 34 which can useful when connecting to the substrate 20 as illustrated in FIG. 1. The connection portion 34 can have connection pads 36. To avoid clutter, only two of the connection pads 36 are designated with the reference number 36.

Although the Figures illustrate a flex interconnect 32 structure, for alternate embodiments, there are various ways to attach the image modules 40 and 60 to the substrate, for example, wire-bonding, direct chip attach (flip chip solder bumping), or other adhesive/connective methods can be used. These include pre-assembly of said sensor/image processor ICS to a first substrate that is then assembled onto a second substrate. Further, a substrate could be a second integrated circuit (IC).

The images captured by the image modules 40 and 60 are displayed on the screen 16 of the apparatus 10, one image at a time or in any combination with other images. For example, a captured image from the first image module 40 can be displayed simultaneously with a captured image from the second image module 60. In addition, still-image graphics and text can be generated and embedded or overlaid in the final displayed image. Various modes of operation are possible using two image modules.

Referring to FIGS. 1 and 4, a first method of operating a dual camera module 30b is now disclosed that significantly increases the image quality compared with to single camera module operation. One shortcoming of current art using a single camera module is the fact that image quality degrades as the temperature of the operating image module increases during normal operation, especially during high-current operating modes like full-frame video streaming. The imaging degradation can be due to, for example, increased fixed-pattern noise from an increase in dark-current produced because of thermal noise in the IC. In the current art, a user typically takes, or captures, a high-resolution snapshot only after first previewing a scene. However, during preview, the single image module is operating, thus it heat up, subsequently degrading or limiting the quality of the desired final high-resolution image. The preview image is relatively low-resolution compared to the captured high-resolution image.

In the present invention, for the preview function, the scene is first captured using a first image module 40. At this time, a second image module 60b can operate in a low power (hence low thermal) state or not operate at all. Then the scene is captured using the second camera module 60b. The capture using the second camera module is typically at a higher resolution compared to the first capture using the first image module 40. Further, the second capture, or snapshot, can be performed with assistance from the first image module 40 over I2C bus to convey preview results. As a result, an improved high-resolution snapshot image is produced.

A second method of operating the dual camera module 30b is now disclosed that describes how to generate a composite image from two (or more) camera modules. A composite image can be displayed in split-screen mode, picture-in-picture mode, or zoom mode. In the split-screen mode, the screen 16 displays an image from the first image module 40 on a first half the screen 16 and an image from the second image module 60b on a second first half of the screen 16. In the picture-in-picture mode, the screen 16 displays (on the full screen 16) an image from the first image module 40 while displaying an image from the second image module 60b on a portion of the screen 16. In the zoom mode, an enlarged image from the first camera module 40 is superimposed with an image from the second camera module 60b for displaying on the screen 16. In fact, these modes can be combined for additional effects. Further, it is understood that the apparatus 10, having the dual camera module 30b, can be configured to display still-image graphics or text anywhere on the screen 16 by introducing these data patterns into its image data stream. For simplicity of discussion, in the sample embodiment, both image modules 40 and 60b can output data at the resolution or image size of the desired final composite image.

Here, each of the image modules 40 and 60b is programmed with a "window-of-disinterest (WOD)" along with what is know in current art as a "window-of-interest (WOI)". Again, for simplicity of discussion, in the sample embodiment, assume that the WOI of the first image module 40 is the WOD of the second image module 60b. During the WOD, each camera module tri-states its image data bus at the same time the other image module outputs its image data during its WOI. As a result, a composite image data stream is generated on the shared tri-state data bus, resulting in a final composite image for display. Of course, multiple modules, with multiple resolutions and orientations can be used to implement variations of these methods. Furthermore, it is understood that a image modules having various resolution levels can be programmed with "virtual" coordinates for WOI and WOD (to facilitate generation of horizontal and vertical sync signals, for example) appropriate for a high-resolution, synchronized final composite image.

Portions 24a of another embodiment of the invention having alternate configuration are shown in FIG. 3. Portions of this embodiment are similar to those shown in FIGS. 1 through 2B. FIG. 3 illustrates a simplified cutaway schematic view of a portion of an apparatus including a dual camera module in accordance with another embodiment of the present invention. For convenience, components in FIG. 3 that are similar to corresponding components in FIGS. 1 through 2B are assigned the same reference numerals, analogous but changed components are assigned the same reference numerals accompanied by letter "a," and different components are assigned different reference numerals.

In this second sample embodiment, the apparatus 24a is similarly configured as the apparatus 10 of FIGS. 1 through 2B except that the first image module 40 and the second image module 60 are mounted on a substrate 20a common to the apparatus 24a. That is, the modules 40 and 60 are mounted on the common substrate 20a to which other components of the apparatus 24a mounted. Various method of mounting the modules 40 and 60 are possible. Some of these methods include, for example only, using preassembled dual-camera modules (for attaching to the substrate, integrated onto the substrate, or any combination of these. In fact, the substrate, for example the common substrate 20a, can be the flex interconnect itself or a modified version of flex interconnect structure.

Portions of yet another embodiment of the invention having alternate configuration are shown in FIG. 4. Portions of this embodiment are similar to those shown in FIGS. 1 through 2B. FIG. 4 illustrates yet another embodiment of the dual camera module of the present invention. For convenience, components in FIG. 4 that are similar to corresponding components in FIGS. 1 to 2B are assigned the same reference numerals, analogous but changed components are assigned the same reference numerals accompanied by letter "b," and different components are assigned different reference numerals.

Here, the dual camera module 30b includes the first image module which is 40 facing the first direction 42 and is attached to a flex interconnect. The second image module 60b is connected to the flex interconnect 32 facing the second direction 62b. Here, the second direction 62b is the same direction as the first direction 42 separated by a predetermined distance. The distance between the modules 40 and 60 allows capture of "stereo" or 3D composite image using both modules 40 and 60. This is not possible with a single imager, and two separate modules don't share the other advantages of the DCM such as, for example only, global I2C addressing, tri-state processing, synchronized timing and communication, and economies of shared assembly and components. Of course, the dual camera module 30b can share some of the components of a single camera module. For example, a module body or frame that encapsulates both camera modules 40 and 60. Further, such "stereo" embodiment could share a single light path (single lens).

In yet another embodiment of FIG. 4, the camera modules 40 and 60 (or individual imagers if sharing a module body), are adapted to generate one (e.g. RED, black/white, or infrared) or two (e.g. RED/GREEN or GREEN/BLUE) color channel information. Images captured using the dual module system 30b can be combined to obtain increased color resolution, spatial resolution, or both. That is, relatively high resolution (color, spatial, or both) information capture is possible using relatively low resolution sensors of the modules 40 and 60. Color resolution can be enhanced because all (or more) of a single sensor imaging pixels can be dedicated to a single color, increasing the frequency or adjacency of same-color pixels. Spatial resolution can be is enhanced because multiple (color) images are combining information from a common scene (common image path). In fact, in various embodiments, the two modules 40 and 60 can have different resolution, capture different color, or both. For example, the first module 40 can have a VGA resolution (of 480 by 640) while the second module 60 has a SVGA resolution (600 by 800). Alternatively, the first module 40 can capture at a first color frequency range (e.g., infrared) while the second module 60 captures at a second color range (e.g., visual spectrum).

From the foregoing, it will be appreciated that the present invention is novel and offers advantages over the current art. Although a specific embodiment of the invention is described and illustrated above, the invention is not to be limited to the specific forms or arrangements of parts so described and illustrated. For example, the camera module of the present invention can include multiple image modules for capturing images in multiple directions, and in various resolutions and orientations. The invention is limited by the claims that follow.

What is claimed is:

1. A dual camera module comprising:
   a substrate having circuitry thereon for receiving image data;
   a first image module for capturing first image data of a first orientation of a first scene, and including a first output for transmitting the first image data to the circuitry on the substrate;
   a second image module for capturing second image data of a second orientation of the first scene, different from the first orientation of the first scene, or a different scene, and including a second output for transmitting the second image data to the circuitry on the substrate; and
   a flex interconnect having a common data line that is shared by the first and second image modules, the common data line being configured to electrically connect the first and second outputs to the circuitry on the substrate,
   wherein, at the first image module, portions of the first image data are selectively blocked, based on a window-of-disinterest indicating the portions of the first image that are not to be transmitted on the common data line from the first image module, by successively tri-stating a connection between the first image module and the common data line during successive time periods and at the second image module, portions of the second image data are transmitted on the common data line during the successive time periods by successively tri-stating a connection between the second image module and the common data line, the successive time periods synchronizing the first and second image data received by the circuitry on the substrate to generate a picture-in-picture image that includes unblocked portions of the captured first image data and the transmitted portions of the second image data.

2. The dual camera module recited in claim 1, further comprising: control lines, further data lines and at least one component on the flex interconnect that are shared by the first and second image modules.

3. The dual camera module recited in claim 1, wherein each of the image modules comprises a lens and an imaging sensor.

4. The dual camera module recited in claim 1, wherein each of the image modules comprises a lens and a combination imaging sensor and image processor.

5. The dual camera module recited in claim 1, wherein the first image module faces a first direction and the second image module faces a second direction such that the first image data represents the first scene and the second image data represents the different scene.

6. The dual camera module recited in claim 1, wherein each of the image modules is uniquely addressable.

7. The dual camera module recited in claim 1, wherein the first and second image modules respond to a common or global address.

8. The dual camera module recited in claim 1, wherein said flex interconnect includes an Inter-IC (I2C) bus.

9. The dual camera module recited in claim 1, wherein said flex interconnect includes a Serial Peripheral Interface (SPI).

10. The dual camera module recited in claim 1, wherein each of the image modules is programmed to respond to a unique Inter-IC (I2C) address.

11. The dual camera module recited in claim 1, wherein each of the image modules is programmed to respond to a common address.

12. The dual camera module recited in claim 1, wherein the first and second image modules are configured to alternate the tri-stating of the connection with the common data line.

13. The dual camera module recited in claim 1, wherein the first image module captures images at a first resolution and the second image module captures images at a second resolution.

14. The dual camera module recited in claim 1, wherein the first and second image module face a common direction such that the first image module captures images from the first orientation of the first scene and the second image module captures images from the second orientation of the first scene.

15. The dual camera module recited in claim 1, wherein the first image module captures images of a first color range and the second image module captures images of a second color range.

16. The dual camera module recited in claim 1, wherein the first image module has a first focal length and a second image module has a second focal length.

17. The dual camera module recited in claim 1, wherein:
the first and second image modules have a shared, common housing and include first and second imaging arrays, respectively; and
the flex interconnect attaches the shared, common housing to the substrate and electrically connects the first and second imaging arrays to the circuitry of the substrate.

18. An electronic apparatus comprising:
a substrate having circuitry thereon for receiving image data; and
a dual camera module connected to said substrate, said dual camera module adapted to capture images, the dual camera module including
a first image module adapted to capture a first image in a first direction, and including a first output for transmitting the first captured image to the circuitry on the substrate,
a second image module adapted to capture second image in a second direction, and including a second output for transmitting the second captured image to the circuitry on the substrate, and
a common set of data lines that are shared by the first and second image modules, the common set of data lines being configured to electrically connect the first and second outputs to the circuitry on the substrate,
wherein, at the first image module, portions of the first captured image are selectively blocked, based on a window-of-disinterest indicating the portions of the first captured image that are not to be transmitted on the common set of data lines from the first image module, by successively tri-stating a connection between the first image module and the common set of data lines during successive time periods and at the second image module, portions of the second captured image are transmitted on the common set of data lines during the successive time periods by successively tri-stating a connection between the second image module and the common set of data lines, the successive time periods synchronizing the first and second captured images received by the circuitry on the substrate to generate a picture-in-picture image that includes unblocked portions of the first captured image and the transmitted portions of the second captured image.

19. The electronic apparatus recited in claim 18, wherein each of the image modules comprises a lens and an imaging sensor.

20. The electronic apparatus recited in claim 18, wherein each of the image modules comprises a lens and a combination sensor and image processor.

21. The electronic apparatus recited in claim 18, wherein each of the image modules further comprises an imaging filter.

22. The electronic apparatus recited in claim 18, wherein the first direction and the second direction are opposite directions relative to each other.

23. The electronic apparatus recited in claim 18, wherein said common set of data lines is included in a flex interconnect that includes an Inter-Integrated Circuit (I2C) bus.

24. The electronic apparatus recited in claim 18, wherein said common set of data lines is included in a flex interconnect that includes a Serial Peripheral Interface (SPI) bus.

25. The electronic apparatus recited in claim 24, wherein each of the image modules is programmed to respond to a unique slave select signal on the SPI bus.

26. The electronic apparatus recited in claim 23, wherein each of the image modules is programmed to respond to a unique I2C address.

27. The electronic apparatus recited in claim 18, wherein the image modules respond to a common address.

28. The electronic apparatus recited in claim 18, further comprising: a screen for displaying the picture-in-picture image.

29. The electronic apparatus recited in claim 18, further comprising: a screen coupled to the circuitry on the substrate for displaying the picture-in-picture image which includes the second captured image being selectively tri-stated based on a window-of-interest to generate a picture-in-picture orientation of the first and second captured image for display.

30. The electronic apparatus recited in claim 18, wherein said first image module has a first focal length and said second image module has a second focal length.

31. The electronic apparatus recited in claim 18, wherein the first image module captures images of a first resolution and the second image module captures images of a second resolution.

32. An electronic apparatus, comprising:
a substrate;
a first image module adapted to capture a first image with a first orientation in a first direction and mounted on said substrate;
a second image module adapted to capture a second image with a second orientation in either the first direction or in a second direction and mounted on said substrate; and
a screen coupled to the substrate and adapted to display the first and second images captured by said first and second image modules,
wherein, at the first image module, portions of the first captured image are selectively blocked, based on a window-of-disinterest indicating the portions of the first captured image that are not to be transmitted on the common data line from the first image module, by successively tri-stating an output thereof during successive time periods and at the second image module, portions of the second captured image are transmitted on the common data line during the successive time periods by successively tri-stating an output thereof, the successive time periods synchronizing the first and second captured images received by circuitry on the substrate to generate a picture-in-picture image that includes unblocked portions of the first captured image and the transmitted portions of the second captured image on the screen.

33. The electronic apparatus recited in claim 18, further comprising:
a screen for displaying the picture-in-picture image.

34. The electronic apparatus recited in claim 32, wherein each of the image modules comprises a lens and an imaging sensor.

35. The electronic apparatus recited in claim 32, wherein each of the image modules is a combination sensor and image processor.

36. The electronic apparatus recited in claim 32, wherein said first image module faces the first direction and said second image module faces the second direction.

37. A method of operating an electronic apparatus, the electronic apparatus including first and second image modules having first and second outputs, respectively, said method comprising:

capturing first and second scenes, as first and second data streams, using the first image module and the second image module, respectively;

transmitting the first image data stream to circuitry on a substrate via at least one common data line and the first output of the first image module;

transmitting the second image data stream to the circuitry on the substrate via the at least one common data line and the second output of the second image module; and synchronizing the first and second image data streams received by the circuitry on the substrate by (1) selectively blocking reception of portions of the first image data stream, based on a window-of-disinterest indicating the portions of the first image data stream that are not to be transmitted on the at least one common data line from the first image module such that the first output between the first image module and the at least one common data line is successively tri-stated during successive time periods to transmit by the first output unblocked portions of the first image data stream via the at least one common data line to the circuitry on the substrate, and (2) transmitting portions of the second image data stream on the at least one common data line during the successive time periods by successively tri-stating the second output between the second image module and the at least one common data line to generate a picture-in-picture image data stream that includes the unblocked portions of the first image data stream and the transmitted portions of the second image data stream.

38. The method recited in claim 37 wherein the at least one common data line is included in a shared tri-state bus and the synchronizing of the first and second image data streams includes selectively tri-stating the first and second outputs using the shared tri-state bus to generate the picture-in-picture image data stream.

* * * * *